(12) United States Patent
Longman et al.

(10) Patent No.: US 10,900,681 B2
(45) Date of Patent: Jan. 26, 2021

(54) CONTAMINANT SCRUBBER OF AN HVAC SYSTEM

(71) Applicant: Air Distribution Technologies IP, LLC, Milwaukee, WI (US)

(72) Inventors: Michael G. Longman, Coppell, TX (US); Steven M. Trame, Springboro, OH (US)

(73) Assignee: Air Distribution Technologies IP, LLC, Milwaukee, WI (US)

( * ) Notice: Subject to any disclaimer, the term of this patent is extended or adjusted under 35 U.S.C. 154(b) by 258 days.

(21) Appl. No.: 16/014,949

(22) Filed: Jun. 21, 2018

(65) Prior Publication Data
US 2019/0255479 A1    Aug. 22, 2019

Related U.S. Application Data

(60) Provisional application No. 62/523,132, filed on Jun. 21, 2017.

(51) Int. Cl.
*F24F 13/28*    (2006.01)
*F24F 11/00*    (2018.01)
(Continued)

(52) U.S. Cl.
CPC ...... *F24F 11/0001* (2013.01); *B01D 53/0415* (2013.01); *B01D 53/0438* (2013.01); *B01D 53/0454* (2013.01); *B01D 53/0473* (2013.01); *B01D 53/62* (2013.01); *B01D 53/72* (2013.01); *B01D 53/96* (2013.01); *F24F 3/1603* (2013.01); *F24F 11/30* (2018.01); *F24F 11/39* (2018.01); *F24F 11/62* (2018.01); *F24F 11/65* (2018.01);
(Continued)

(58) Field of Classification Search
CPC ............ B01D 46/0006; B01D 2279/50; B01D 53/0438; B01D 2259/4068; F24F 13/28; F24F 3/1603; F24F 2120/10; F24H 9/0052
USPC ................. 55/481, 484, DIG. 31, 473, 385.2
See application file for complete search history.

(56) References Cited

U.S. PATENT DOCUMENTS 6,726,558 B1    4/2004    Meirav
6,866,701 B2    3/2005    Meirav
(Continued)

*Primary Examiner* — Minh Chau T Pham
(74) *Attorney, Agent, or Firm* — Fletcher Yoder, P.C.

(57) ABSTRACT

A contaminant scrubber of a heating, ventilation, and air conditioning (HVAC) system includes a housing having a first side wall and a second side wall opposite to the first side wall. The contaminant scrubber also includes a first compartment formed within the housing, a second compartment formed within the housing and having a cartridge set removably disposed therein, and a third compartment formed within the housing, where the second compartment is positioned between the first compartment and the third compartment. The contaminant scrubber also includes a first cross-member beam extending along a first bottom end of the first compartment and a second top end of the second compartment, where the first cross-member beam extends from the first side wall of the housing to the second side wall of the housing. The contaminant scrubber also includes a second cross-member beam extending along a second bottom end of the second compartment and a third top end of the third compartment, wherein the second cross-member beam extends from the first side wall of the housing to the second side wall of the housing.

23 Claims, 13 Drawing Sheets

(51) Int. Cl.
- F24F 3/16 (2006.01)
- F24F 11/30 (2018.01)
- F24F 11/62 (2018.01)
- B01D 53/04 (2006.01)
- F24F 11/39 (2018.01)
- F24F 11/65 (2018.01)
- B01D 53/047 (2006.01)
- G05B 15/02 (2006.01)
- B01D 53/62 (2006.01)
- B01D 53/72 (2006.01)
- B01D 53/96 (2006.01)
- F24F 110/12 (2018.01)
- F24F 110/70 (2018.01)
- F24F 110/20 (2018.01)
- F24F 110/50 (2018.01)
- F24F 110/10 (2018.01)
- F24F 140/40 (2018.01)
- F24F 110/22 (2018.01)
- F24F 110/65 (2018.01)
- B01D 53/02 (2006.01)
- F24F 110/66 (2018.01)
- B60H 3/06 (2006.01)
- F24F 120/10 (2018.01)
- F24F 130/00 (2018.01)
- F24F 130/10 (2018.01)

(52) U.S. Cl.
CPC .............. *G05B 15/02* (2013.01); *B01D 53/02* (2013.01); *B01D 2257/504* (2013.01); *B01D 2257/708* (2013.01); *B01D 2258/06* (2013.01); *B01D 2259/4068* (2013.01); *B01D 2259/40088* (2013.01); *B01D 2259/4508* (2013.01); *B60H 2003/0691* (2013.01); *F24F 2003/1639* (2013.01); *F24F 2011/0002* (2013.01); *F24F 2110/10* (2018.01); *F24F 2110/12* (2018.01); *F24F 2110/20* (2018.01); *F24F 2110/22* (2018.01); *F24F 2110/50* (2018.01); *F24F 2110/65* (2018.01); *F24F 2110/66* (2018.01); *F24F 2110/70* (2018.01); *F24F 2120/10* (2018.01); *F24F 2130/00* (2018.01); *F24F 2130/10* (2018.01); *F24F 2140/40* (2018.01)

(56) References Cited

U.S. PATENT DOCUMENTS

| | | | |
|---|---|---|---|
| 8,157,892 B2 | 4/2012 | Meirav | |
| 8,211,198 B2 * | 7/2012 | Weber | F24F 13/28 55/496 |
| 8,409,337 B1 * | 4/2013 | Osborne | B01D 53/0407 55/481 |
| 8,491,710 B2 | 7/2013 | Meirav | |
| 8,690,999 B2 | 4/2014 | Meirav et al. | |
| 8,999,029 B1 * | 4/2015 | Brandt | B01D 46/0006 55/484 |
| 9,316,410 B2 | 4/2016 | Meirav et al. | |
| 9,328,936 B2 | 5/2016 | Meirav et al. | |
| 9,375,672 B2 | 6/2016 | Meirav et al. | |
| 9,399,187 B2 | 7/2016 | Meirav et al. | |
| 9,533,250 B2 | 1/2017 | Meirav et al. | |
| 9,566,545 B2 | 2/2017 | Meirav et al. | |
| 10,434,448 B1 * | 10/2019 | Honnecke | B01D 46/0006 |
| 2004/0112211 A1 | 6/2004 | Meirav | |
| 2006/0016163 A1 * | 1/2006 | O'Connor | B01D 46/0023 55/481 |
| 2008/0034776 A1 * | 2/2008 | Jensen | F24F 3/1603 62/305 |
| 2008/0160902 A1 * | 7/2008 | Desler | F24F 1/0033 454/251 |
| 2009/0301123 A1 * | 12/2009 | Monk | H05K 7/1497 62/259.2 |
| 2010/0041327 A1 * | 2/2010 | Desler | F24F 1/0053 454/184 |
| 2010/0101097 A1 * | 4/2010 | Thien | B26B 25/002 30/276 |
| 2011/0198055 A1 | 8/2011 | Meirav et al. | |
| 2011/0265648 A1 | 11/2011 | Meirav et al. | |
| 2011/0277490 A1 | 11/2011 | Meirav | |
| 2012/0273980 A1 | 11/2012 | Meirav | |
| 2013/0178987 A1 | 7/2013 | Meirav et al. | |
| 2013/0291732 A1 | 11/2013 | Meirav | |
| 2014/0020559 A1 | 1/2014 | Meirav et al. | |
| 2014/0202330 A1 | 7/2014 | Meirav et al. | |
| 2014/0298996 A1 | 10/2014 | Meirav et al. | |
| 2014/0326428 A1 | 11/2014 | Meirav et al. | |
| 2015/0078964 A1 | 3/2015 | Meirav et al. | |
| 2015/0258488 A1 | 9/2015 | Meirav et al. | |
| 2015/0298043 A1 | 10/2015 | Meirav et al. | |
| 2015/0321135 A1 | 11/2015 | Meirav et al. | |
| 2015/0352518 A1 | 12/2015 | Meirav et al. | |
| 2015/0375157 A1 | 12/2015 | Meirav et al. | |
| 2016/0025578 A1 | 1/2016 | Meirav et al. | |
| 2016/0082383 A1 | 3/2016 | Meirav et al. | |
| 2016/0187012 A1 | 6/2016 | Meirav et al. | |
| 2016/0228809 A1 | 8/2016 | Meirav et al. | |
| 2016/0228811 A1 | 8/2016 | Meirav et al. | |
| 2016/0282001 A1 | 9/2016 | Meirav et al. | |
| 2016/0288043 A1 | 10/2016 | Meirav et al. | |
| 2016/0303503 A1 | 10/2016 | Meirav et al. | |
| 2016/0363333 A1 | 12/2016 | Meirav et al. | |
| 2017/0056812 A1 | 3/2017 | Meirav et al. | |
| 2017/0136399 A1 | 5/2017 | Meirav et al. | |
| 2019/0128560 A1 * | 5/2019 | Frederick | F24F 13/222 |
| 2020/0101408 A1 * | 4/2020 | Brown | B01D 46/10 |

* cited by examiner

CONTAMINANT SCRUBBER OF AN HVAC SYSTEM

CROSS REFERENCE TO RELATED APPLICATIONS

This application claims priority from and the benefit of U.S. Provisional Application Ser. No. 62/523,132, entitled "CONTAMINANT SCRUBBER OF AN HVAC SYSTEM", filed Jun. 21, 2017, which is hereby incorporated by reference.

BACKGROUND

The present disclosure relates generally to contaminant scrubbers utilized in heating, ventilation, and air conditioning (HVAC) systems. Specifically, the present disclosure relates to features of a contaminant scrubber that facilitate improved efficiency of the HVAC system, and improved manufacturability, assembly, maintenance, and repair of the contaminant scrubber.

HVAC systems are generally configured to provide temperature controlled air to an internal space. To do so, the HVAC system may combine a portion of outdoor air with a portion of indoor air returned to the HVAC system from the internal space (e.g., "return air"). The return air may include an undesirable amount of carbon dioxide (and other contaminants, such as formaldehyde and volatile organic compounds) compared to the outdoor air, but may be less expensive to heat or cool than the outdoor air. Thus, the outdoor air is used primarily for ventilation purposes.

To reduce an amount of outdoor air required for ventilation purposes, HVAC systems may include a contaminant scrubber that receives the return air, removes at least some of the carbon dioxide and other contaminants from the return air, and outputs the cleaner return air for use by an air handling unit. The air handling unit may receive the portion of outdoor air, receive the portion of return air cleaned and output by the contaminant scrubber, combine the portions together as a supply air, and output the supply air for use by components of the HVAC downstream of the air handling unit.

HVAC systems, and contaminant scrubbers thereof in particular, may be regulated in various jurisdictions to require certain components and/or functionality. The regulations may vary from jurisdiction to jurisdiction, and traditional contaminant scrubbers may fail to meet certain of these regulations in certain of these jurisdictions. Further, traditional contaminant scrubbers may be capable of removing only a small amount of carbon dioxide. Accordingly, improved HVAC contaminant scrubbers are desired.

SUMMARY

One embodiment of the present disclosure relates to a contaminant scrubber of a heating, ventilation, and air conditioning (HVAC) system. The contaminant scrubber includes a housing having a first side wall and a second side wall opposite to the first side wall. The contaminant scrubber also includes a first compartment formed within the housing, a second compartment formed within the housing and having a cartridge set removably disposed therein, and a third compartment formed within the housing, where the second compartment is positioned between the first compartment and the third compartment. The contaminant scrubber also includes a first cross-member beam extending along a first bottom end of the first compartment and a second top end of the second compartment, where the first cross-member beam extends from the first side wall of the housing to the second side wall of the housing. The contaminant scrubber also includes a second cross-member beam extending along a second bottom end of the second compartment and a third top end of the third compartment, wherein the second cross-member beam extends from the first side wall of the housing to the second side wall of the housing.

Another embodiment of the present disclosure relates to a contaminant scrubber which includes a housing having a first side wall and a second side wall. The contaminant scrubber also includes a shelf disposed in the housing and extending between the first side wall and the second side wall. The contaminant scrubber also includes a cartridge set disposed on the shelf, and a cross-member beam extending adjacent to the shelf from the first side wall of the housing to the second side wall of the housing, where the cross-member beam is coupled to the first side wall and to the cartridge set or the shelf.

Another embodiment of the present disclosure relates to a heating, ventilation, and air conditioning (HVAC) system having a contaminant scrubber. The contaminant scrubber includes a housing configured to house components of the contaminant scrubber, where the housing includes a first side wall and a second side wall opposite to the first side wall. The contaminant scrubber also includes a cartridge set disposed in a cartridge compartment formed between the first side wall and the second side wall of the housing, where the cartridge compartment is bounded by a first cross-member beam of the contaminant scrubber extending from the first side wall to the second side wall, and a second cross-member beam of the contaminant scrubber extending from the first side wall to the second side wall. The contaminant scrubber also includes a door system configured to enable access to the components within the housing, wherein the door system extends between the first side wall and the second side wall of the housing, and wherein the door system includes at least a cartridge compartment door disposed between the first cross-member beam and the second cross-member beam.

DRAWINGS

Figure 6:
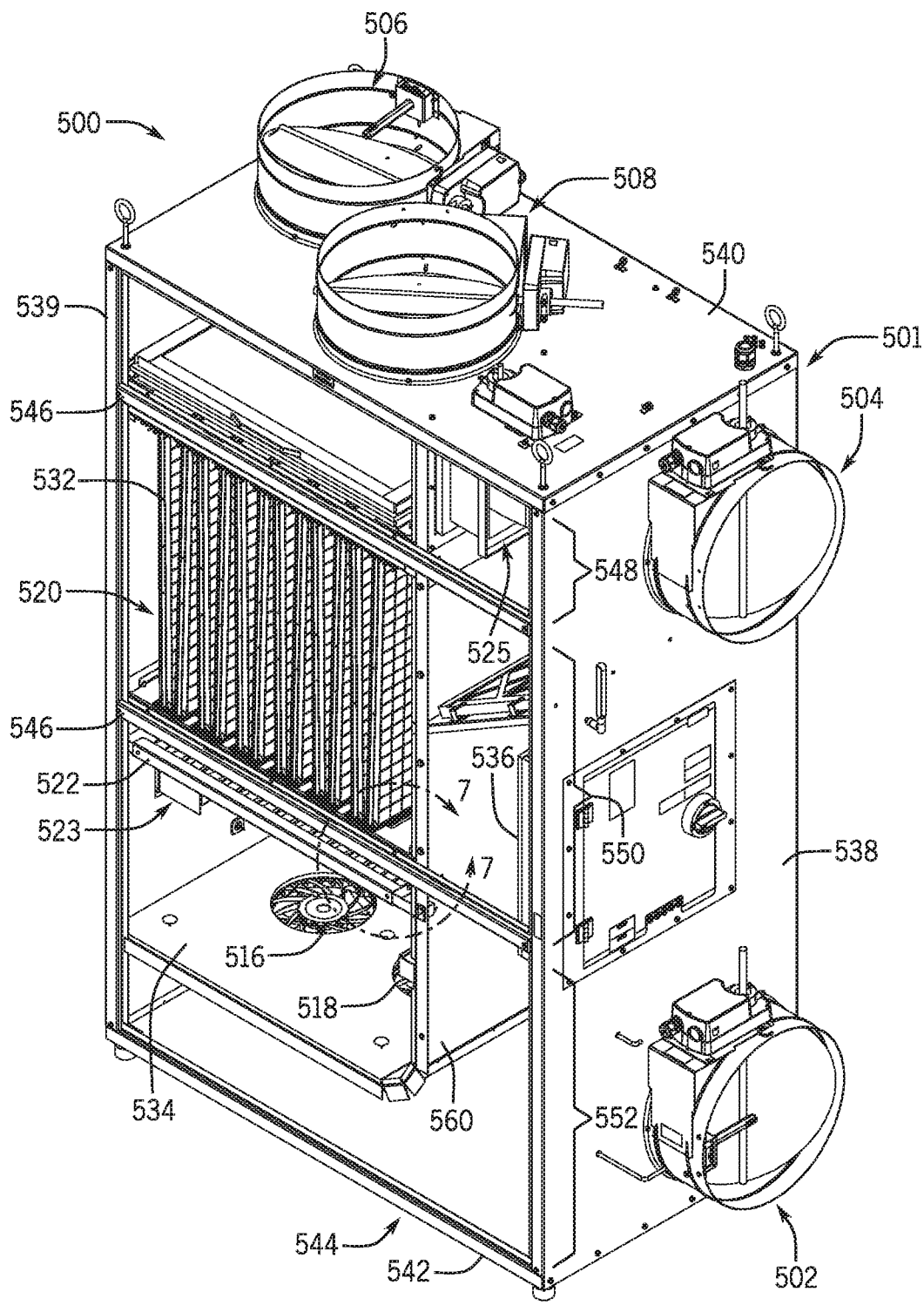
FIG. 6 is an overhead perspective view of an embodiment of a portion of the contaminant scrubber of FIGS. 5A-5C, in accordance with an aspect of the present disclosure.
Figure 9C:
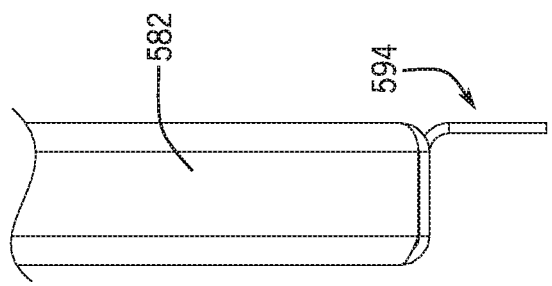
Figure 9B:
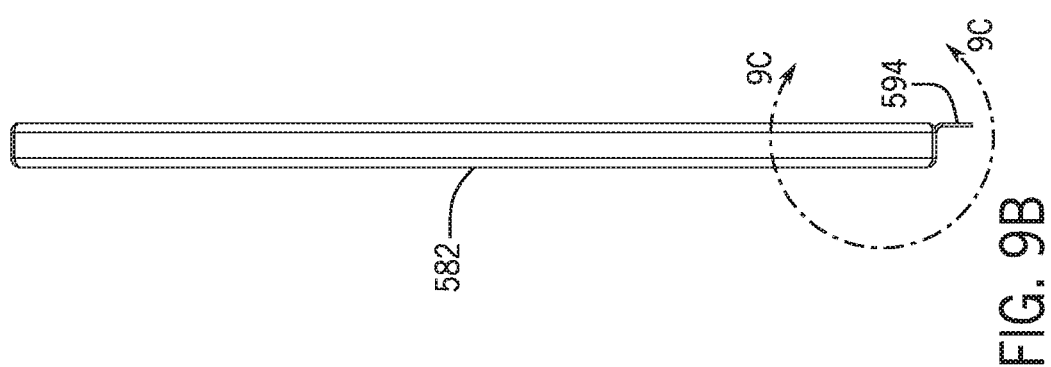
Figure 9:
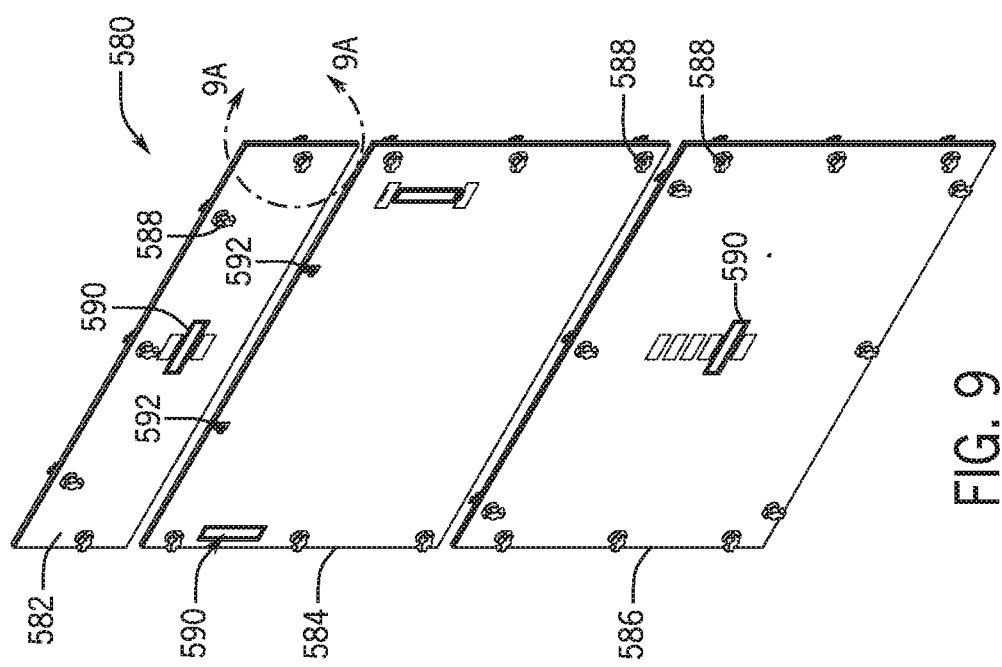
Figure 11:
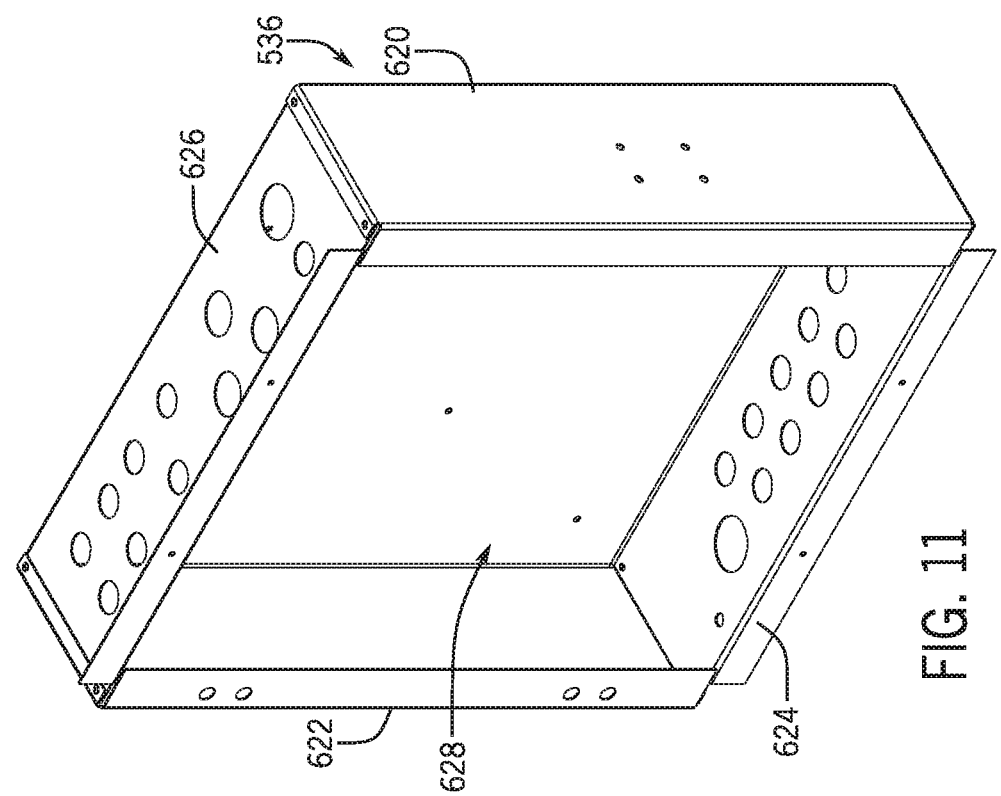
Figure 10:
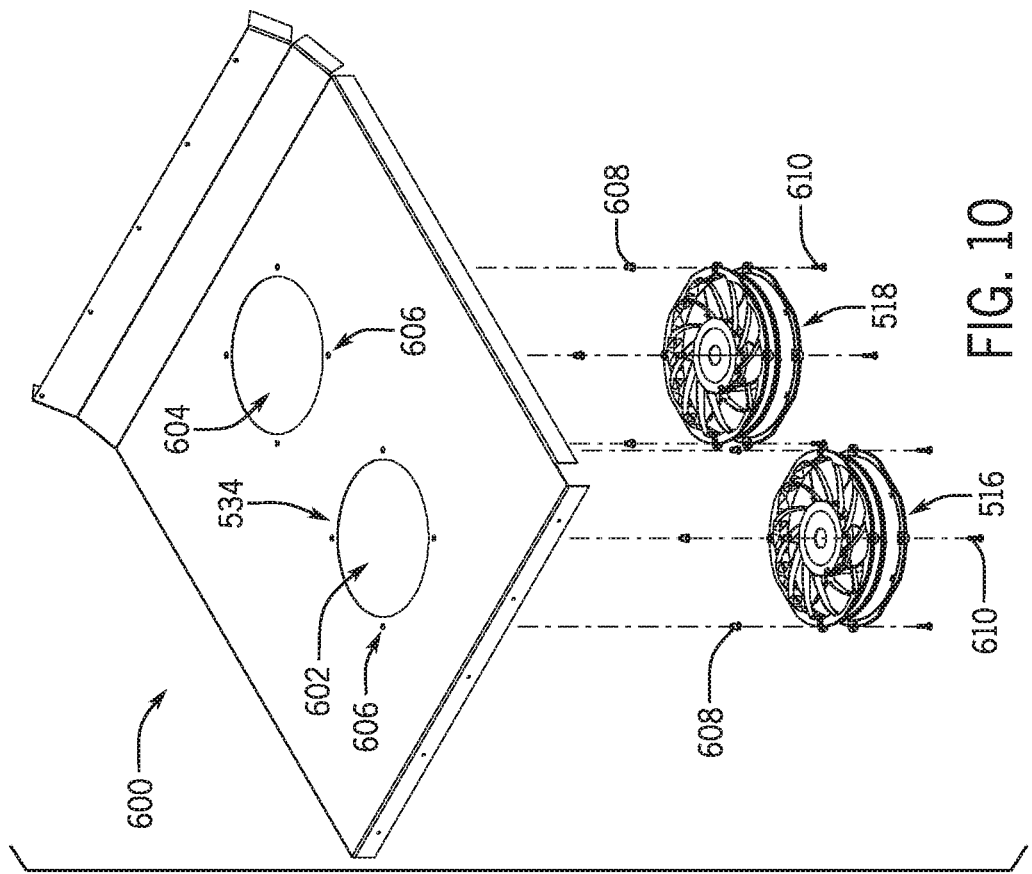
Figure 12:
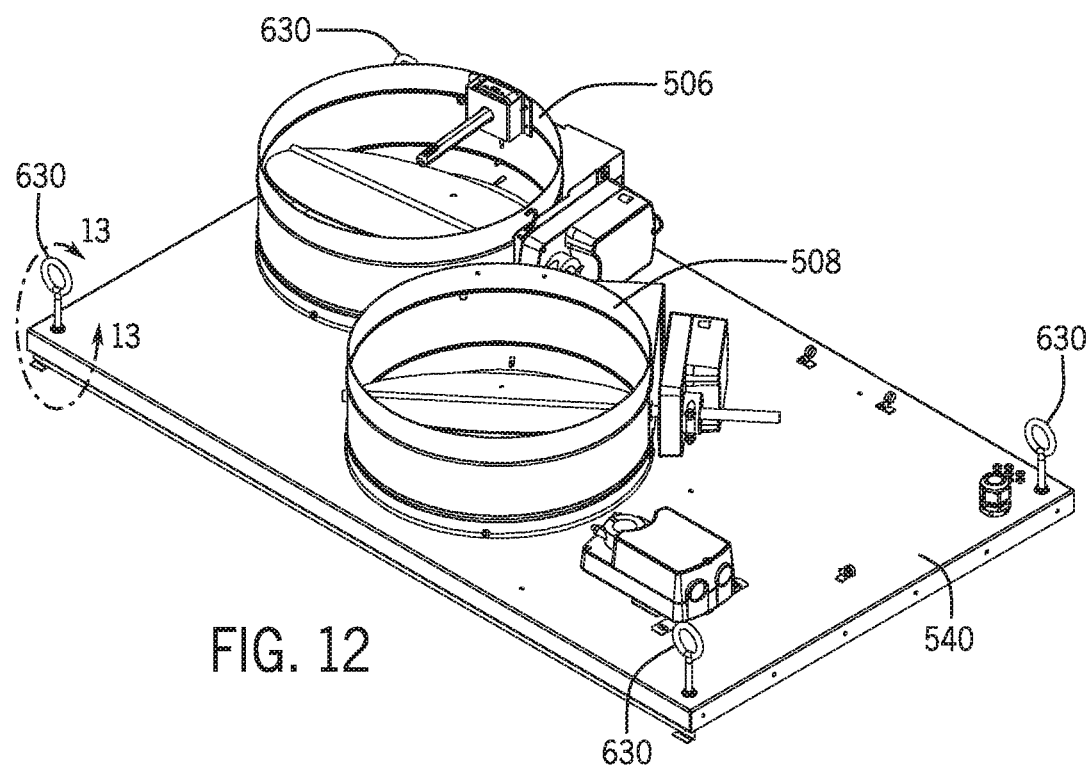
Figure 13:
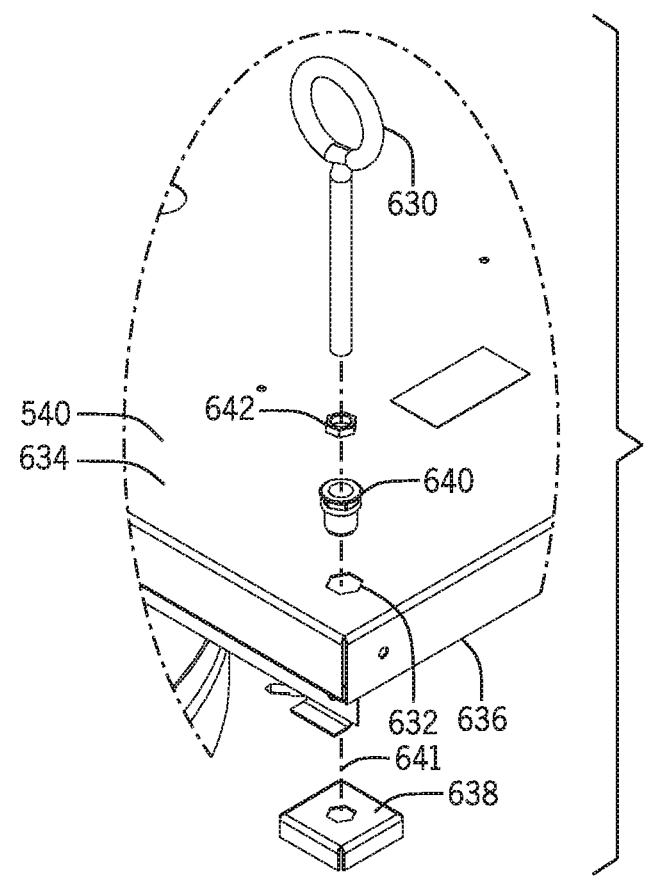
Figure 14:
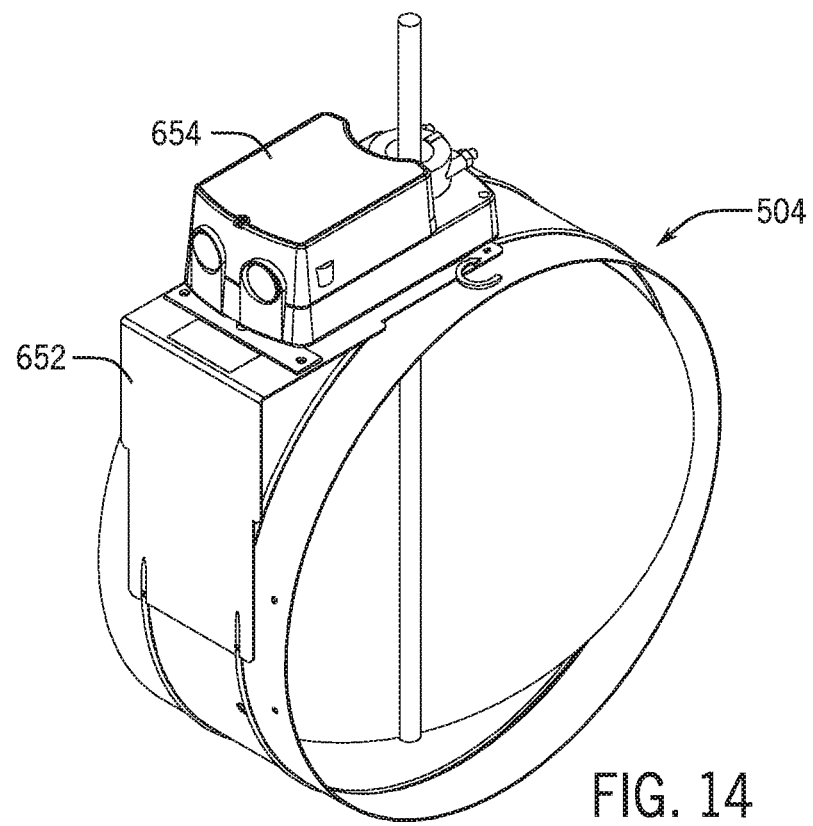
Figure 15:
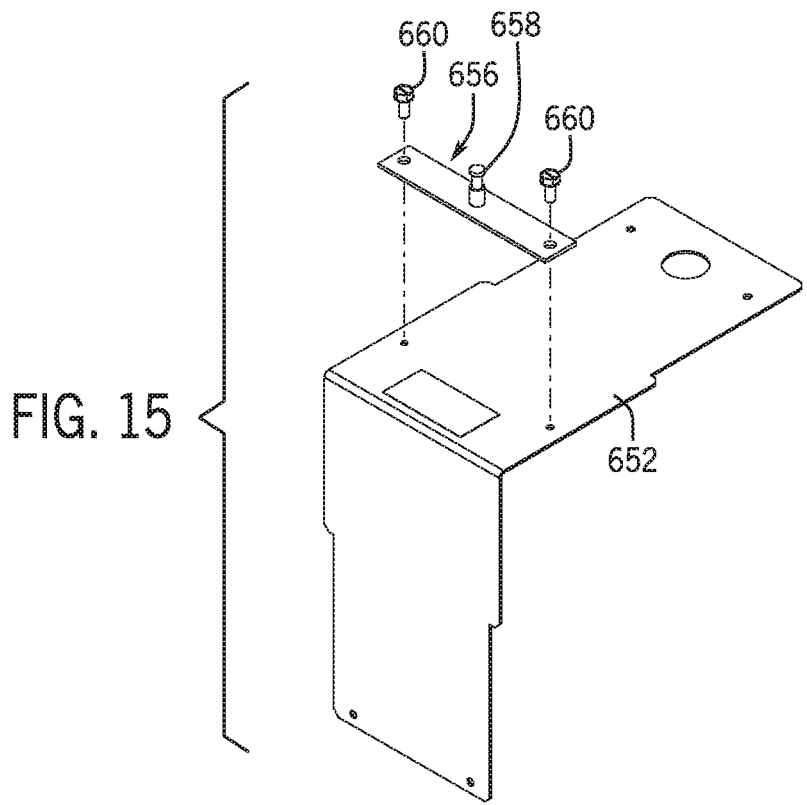
Figure 16:
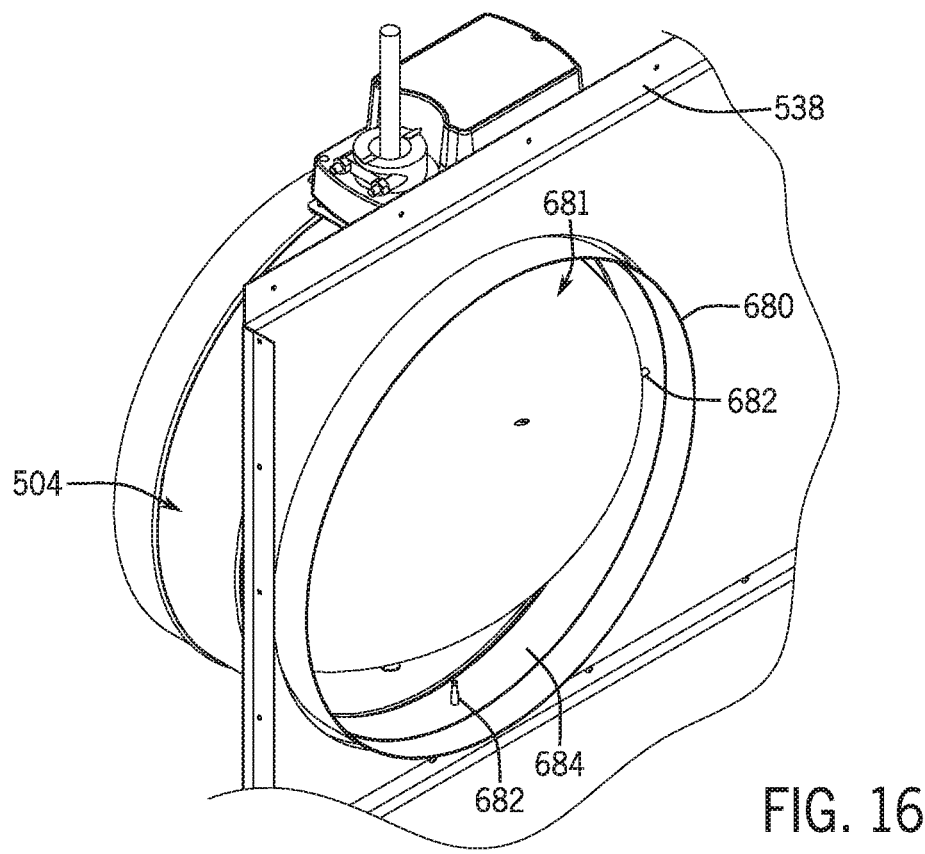
Figure 17:
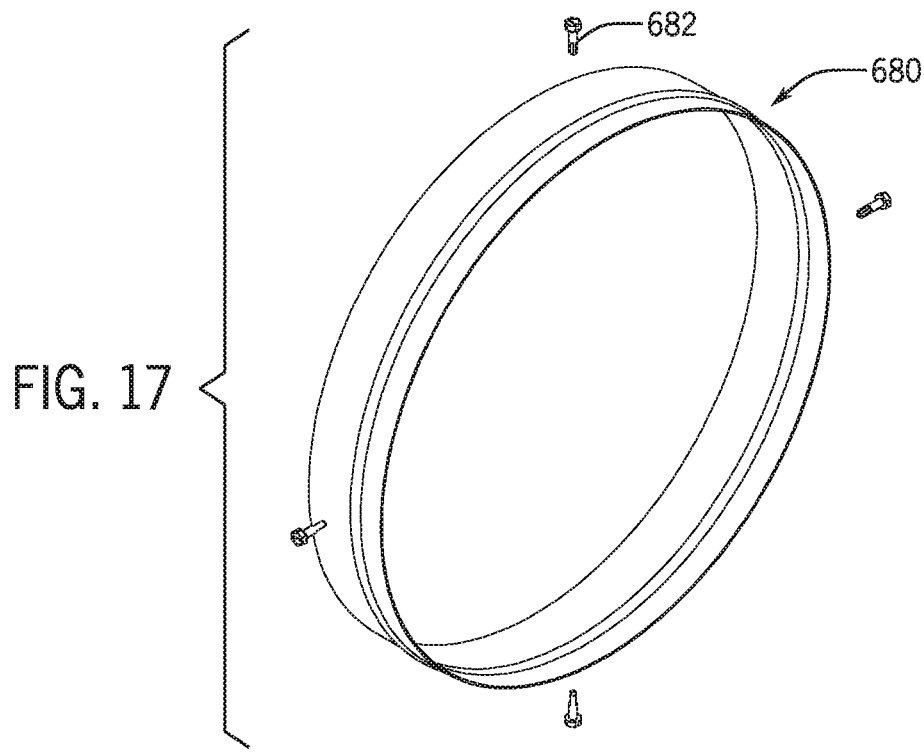
Figure 18:
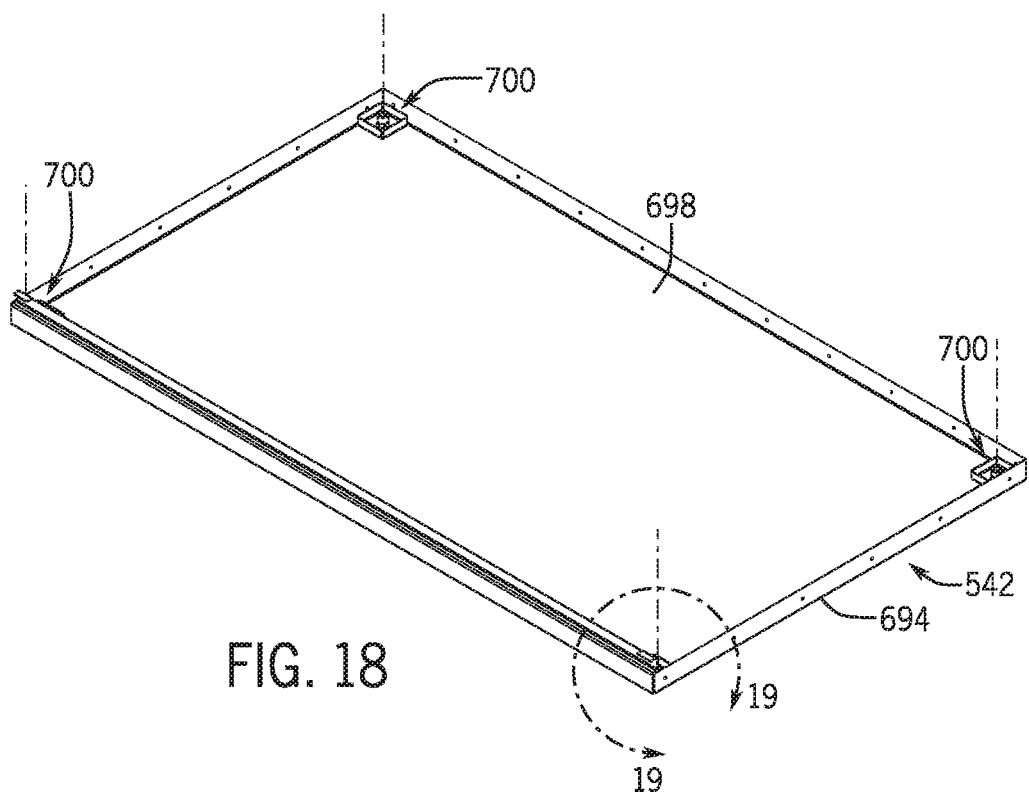
Figure 19:
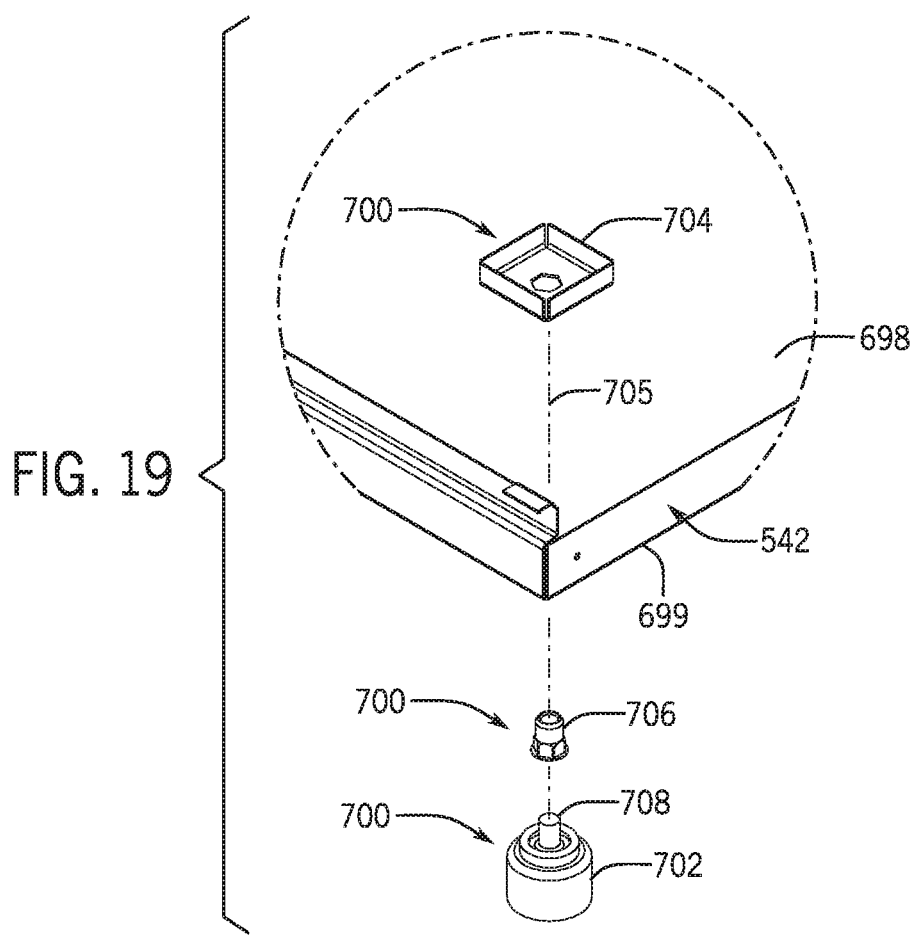

FIG. 9 includes an overhead perspective view of an embodiment of a door system used to at least partially close the portion of the contaminant scrubber illustrated in FIG. 6;

FIG. 9B includes a side view of one of the doors of the door system of FIG. 9, in accordance with an aspect of the present disclosure;

FIG. 9C includes a detailed side view of the door of FIG. 9B, in accordance with an aspect of the present disclosure;

FIG. 10 is an exploded perspective view of an embodiment of a fan system for use in the portion of the contaminant scrubber illustrated in FIG. 6, in accordance with an aspect of the present disclosure;

FIG. 11 is an overhead perspective view of an embodiment of a control box for use in the portion of the contaminant scrubber illustrated in FIG. 6, in accordance with an aspect of the present disclosure;

FIG. 12 is an overhead perspective view of an embodiment of a top panel (having components installed therein and thereon) for use in the portion of the contaminant scrubber illustrated in FIG. 6, in accordance with an aspect of the present disclosure;

FIG. 13 is a close-up, exploded perspective view of an embodiment of an eyelet lifter for installation in the top panel of FIG. 12, taken along line 13-13 in FIG. 12, in accordance with an aspect of the present disclosure;

FIG. 14 is an overhead perspective view of an embodiment of a damper for use in the portion of the contaminant scrubber illustrated in FIG. 6, in accordance with an aspect of the present disclosure;

FIG. 15 is a close-up, exploded perspective view of an embodiment of a mounting bracket for use on the damper of FIG. 14, in accordance with an aspect of the present disclosure;

FIG. 16 is an overhead perspective view of an embodiment of a damper installed in a panel of the portion of the contaminant scrubber illustrated in FIG. 6, in accordance with an aspect of the present disclosure;

FIG. 17 is a close-up, exploded perspective view of an embodiment of a spin ring for installing the damper of FIG. 16 in the panel of FIG. 16, in accordance with an aspect of the present disclosure;

FIG. 18 is an overhead perspective view of an embodiment of a bottom panel for use in the portion of the contaminant scrubber illustrated in FIG. 6, in accordance with an aspect of the present disclosure; and FIG. 19 is a close-up, exploded perspective view of an embodiment of a riser for installation in the bottom panel of FIG. 18, taken along line 19-19 in FIG. 18, in accordance with an aspect of the present disclosure.

DETAILED DESCRIPTION

The present disclosure is directed toward contaminant scrubbers of a commercial, industrial, or residential heating, ventilation, and air conditioning ("HVAC") system. For example, HVAC systems are generally configured to provide temperature controlled air to an internal space. To do so, the HVAC system may combine a portion of outdoor air with a portion of indoor air returned to the HVAC system from the internal space (e.g., "return air"). The return air may include an undesirable amount of carbon dioxide (and other contaminants, such as formaldehyde and volatile organic compounds) compared to the outdoor air, but may be less expensive to heat or cool than the outdoor air. Thus, the outdoor air is used primarily for ventilation purposes.

To reduce an amount of outdoor air required for ventilation purposes, HVAC systems may include a contaminant scrubber that receives the return air, removes at least some of the carbon dioxide and other contaminants from the return air, and outputs the cleaner return air for use by an air handling unit. The air handling unit may receive the portion of outdoor air, receive the portion of return air cleaned and output by the contaminant scrubber, combine the portions together as a supply air, and output the supply air for use by components of the HVAC downstream of the air handling unit.

Contaminant scrubbers in accordance with the present disclosure may include several operating modes. For example, an embodiment of a contaminant scrubber may include a sorption mode, a regeneration mode, and a purge mode. In some embodiments, the regeneration mode and the purge mode of the contaminant scrubber may overlap. In other words, in some embodiments, at least portions of the regeneration and purge modes may occur simultaneously.

During the sorption mode, return air flows into the contaminant scrubber, then flows through a cartridge set of the contaminant scrubber (which removes portions of contaminants from the return air), and flows out of the contaminant scrubber after the portions of contaminants are removed. Dampers of the contaminant scrubber may be controlled to enable various air inputs and outputs. During the regeneration mode, a heating element may be activated to heat an internal space of the contaminant scrubber. The heat may cause the contaminants absorbed by the cartridges of the cartridge set to be released therefrom. The dampers of the contaminant scrubber may be controlled to block air input and outputs during at least portions of the regeneration mode. During the purge mode, the dampers may be controlled to enable purging of the contaminants from the internal space of the contaminant scrubber (e.g., for safe disposal thereof). After the cartridge set is regenerated and the contaminants are purged from the contaminant scrubber, the dampers of the contaminant scrubber may be controlled to enable in-flow of return air to operate the contaminant scrubber in the sorption mode, as previously described. Structural components of the contaminant scrubber are designed to (a) enhance the use of return air to economize the HVAC system; (b) improve a structural integrity of the contaminant scrubber; and/or (c) meet regulatory requirements intended to, e.g., standardize HVAC systems and contaminant scrubbers thereof, facilitate ease of assembly of the contaminant scrubber in a particular HVAC system, etc.

Figure 1:
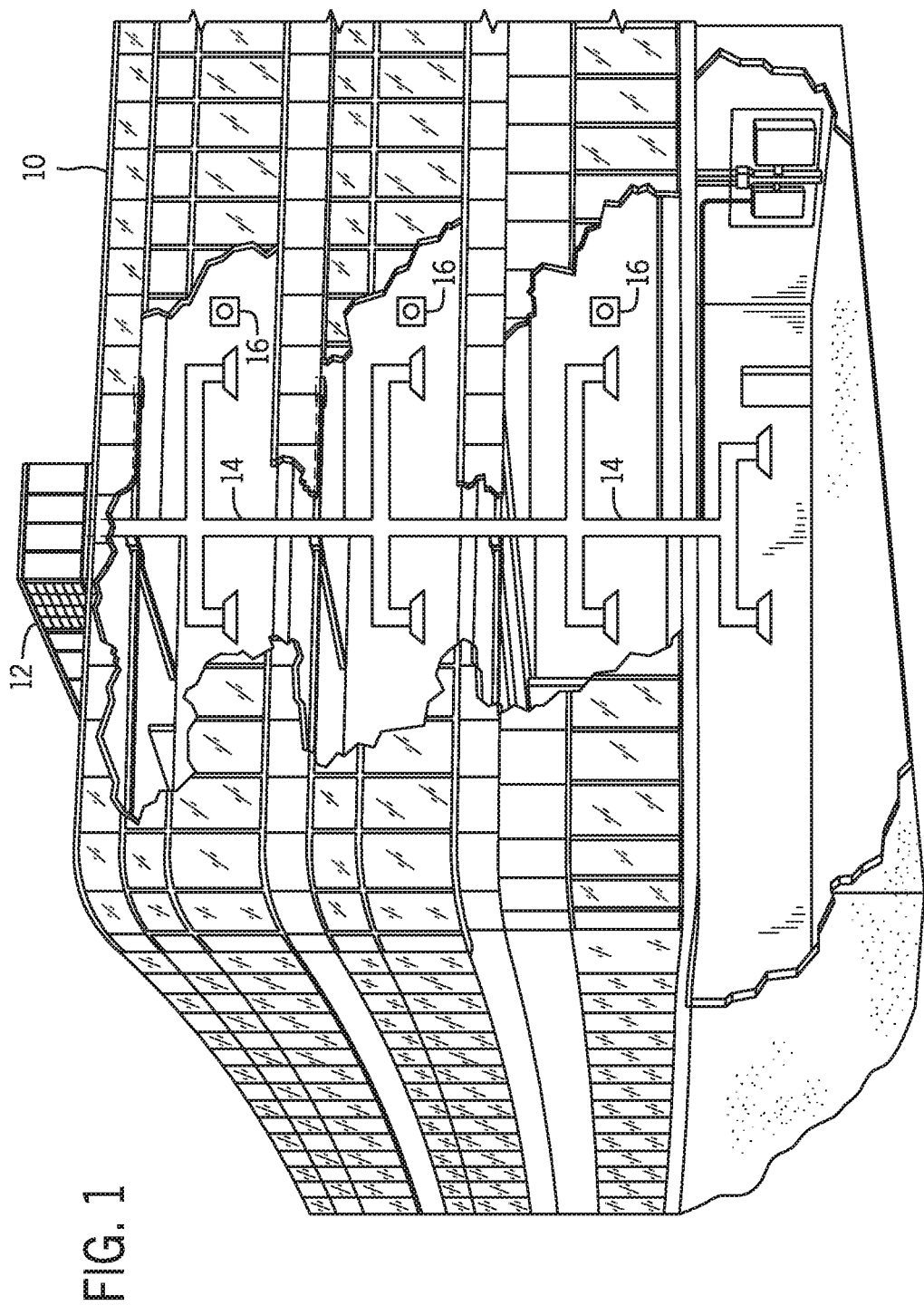
FIG. 1 is a perspective view of an embodiment of a heating, ventilating, and air conditioning (HVAC) system for building environmental management that employs one or more HVAC units, in accordance with an aspect of the present disclosure.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
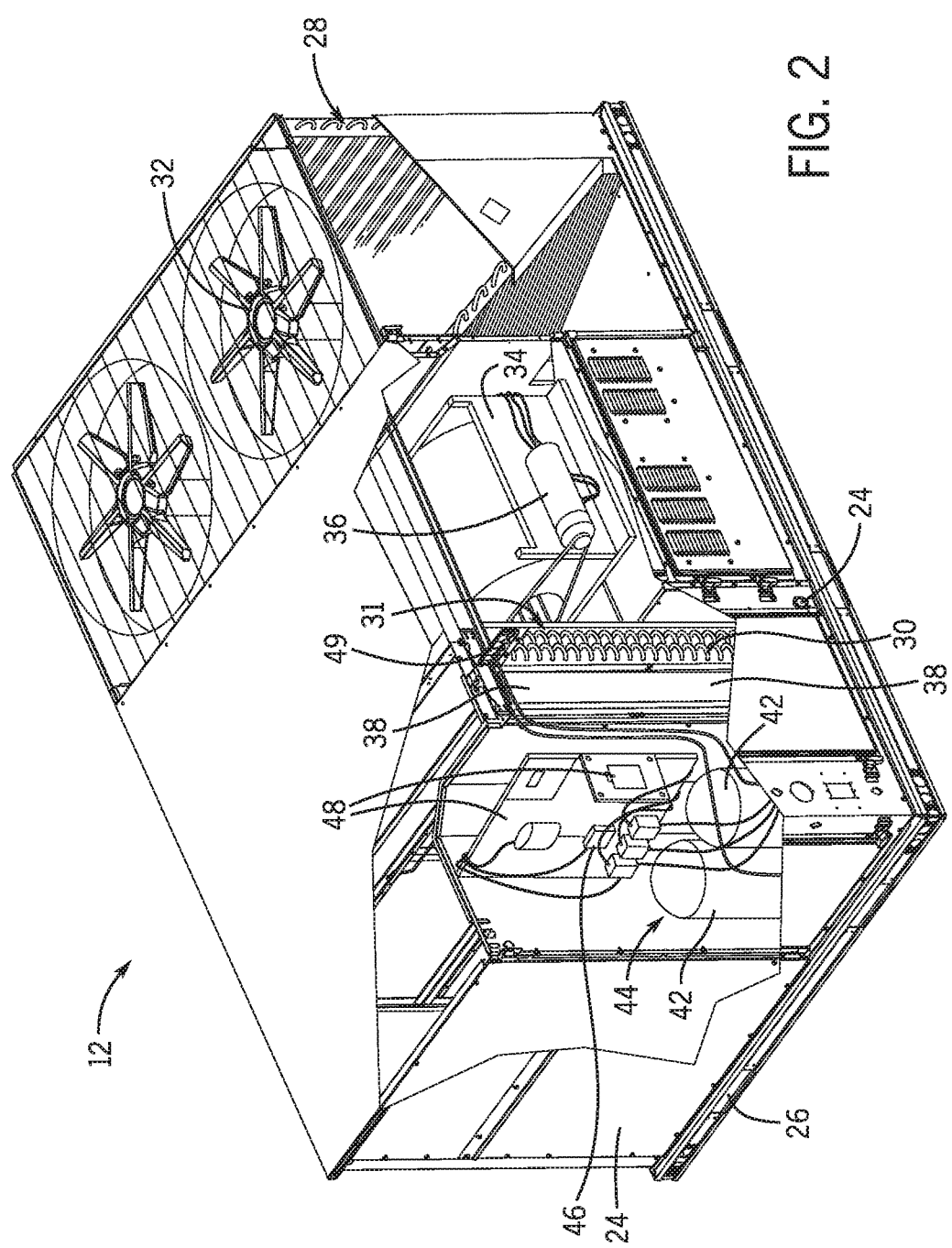
FIG. 2 is a perspective cut-away view of an embodiment of one of the HVAC units of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
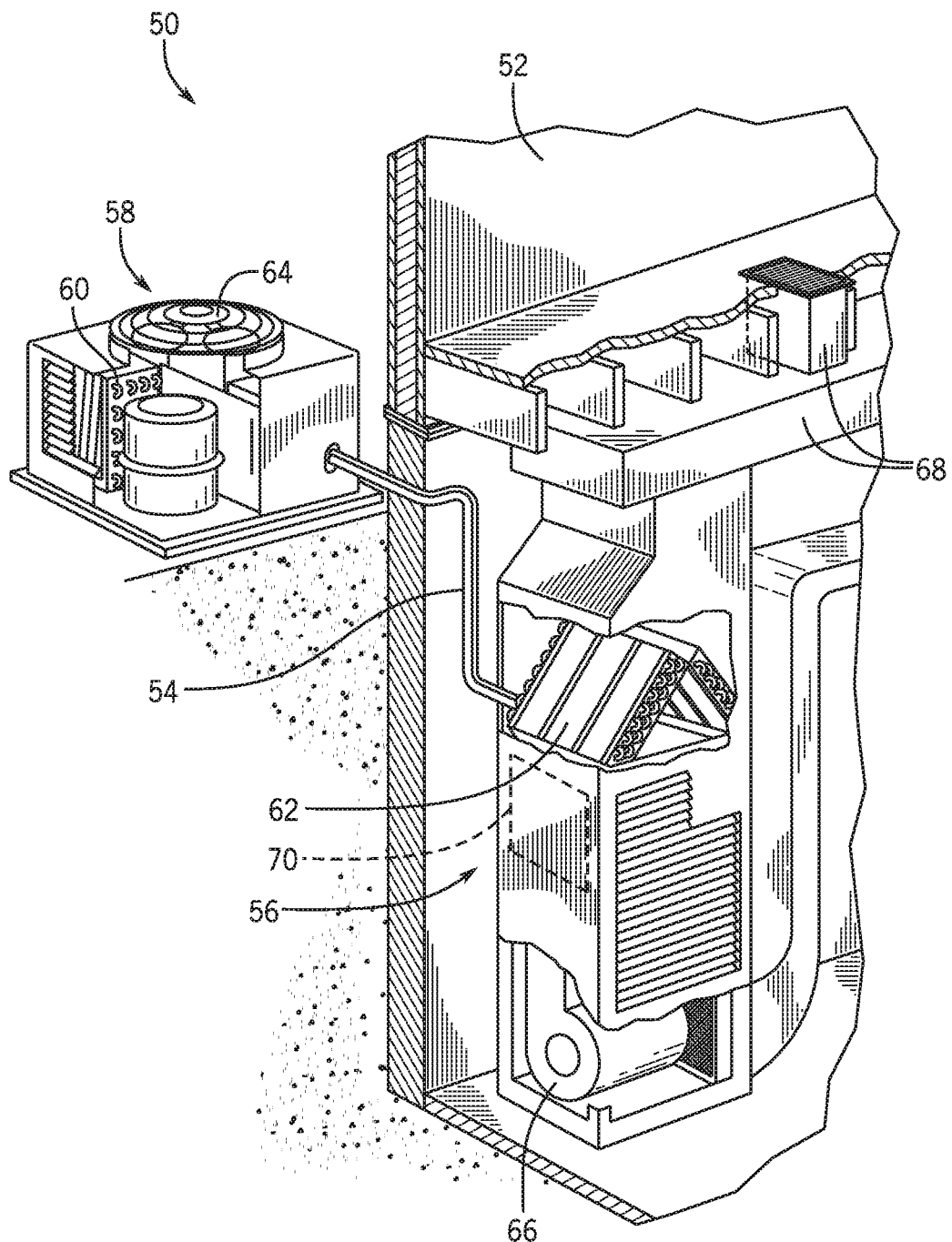
FIG. 3 is a perspective cut-away view of an embodiment of a residential heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
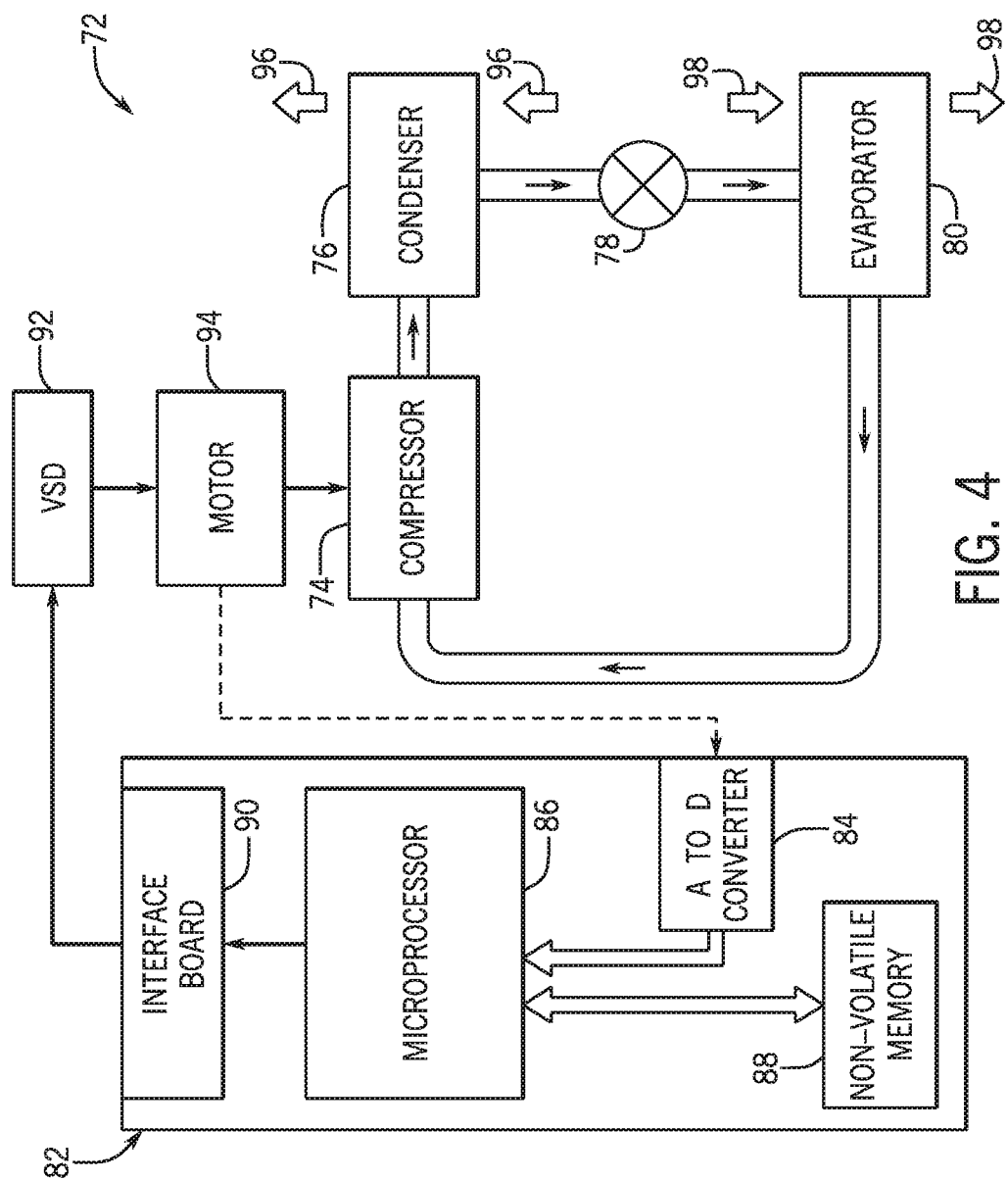
FIG. 4 is a schematic illustration of an embodiment of a vapor compression system for use in any of the systems or units of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications. Any of FIGS. 1-4 may include a contaminant scrubber in accordance with the following description.

Figure 5A:
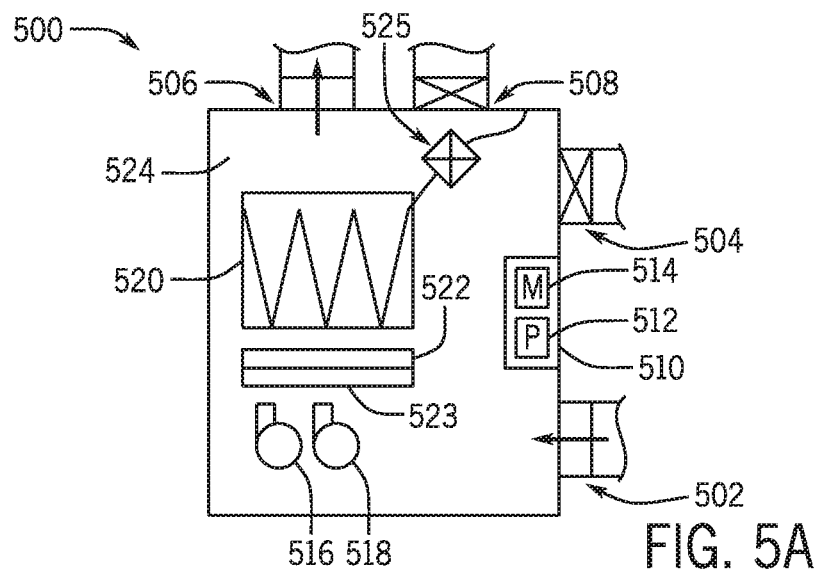
FIG. 5A is a schematic illustration of an embodiment of a contaminant scrubber for use in the HVAC system of FIGS. 1-4, and operating in a first (e.g., sorption) mode, in accordance with an aspect of the present disclosure.
Figure 5B:
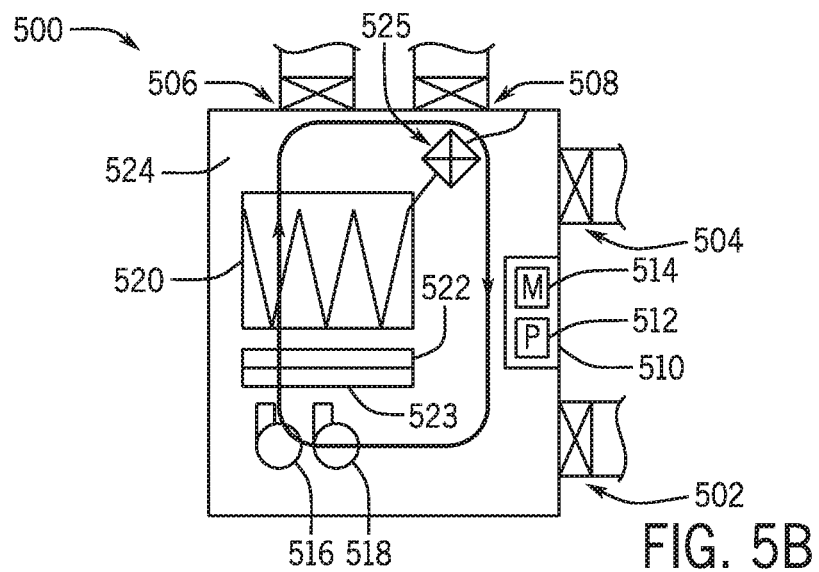
FIG. 5B is a schematic illustration of the contaminant scrubber of FIG. 5A, operating in a second (e.g., regenerative heating) mode, in accordance with an aspect of the present disclosure.
Figure 5C:
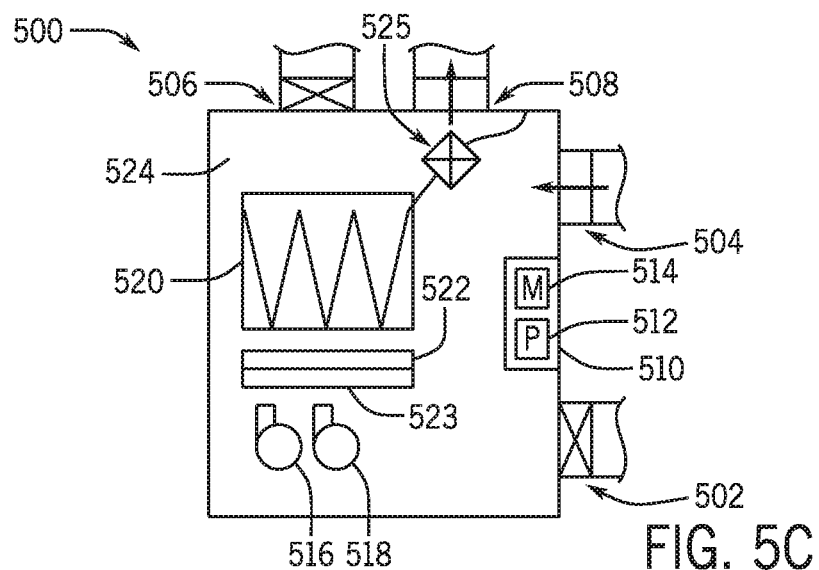
FIG. 5C is a schematic illustration of the contaminant scrubber of FIG. 5A, operating in a third (e.g., purge) mode in accordance with an aspect of the present disclosure.

FIGS. 5A-5C are schematic illustrations of an embodiment of the contaminant scrubber 500 of the HVAC system of FIGS. 1-4. FIG. 5A illustrates the contaminant scrubber 500 operating in a sorption mode, FIG. 5B illustrates the contaminant scrubber 500 operating in a regeneration mode, and FIG. 5C illustrates the contaminant scrubber 500 operating in a purge mode. In some embodiments, the regeneration mode and the purge mode of the contaminant scrubber 500 may overlap. In other words, in some embodiments, at least portions of the regeneration and purge modes may occur simultaneously.

The illustrated contaminant scrubber 500 includes two inlet dampers, namely, a sorption inlet damper 502 and a regeneration inlet damper 504. The illustrated contaminant scrubber 500 also includes two outlet dampers, namely, a sorption outlet damper 506 and a regeneration outlet damper 508, and an internal closed loop damper 525. A control box 510 of the contaminant scrubber 500 operates to, among other things, control opening and closing of the inlet dampers 502, 504 and the outlet dampers 506, 508 and closed loop damper 525 based on the operating mode of the contaminant scrubber 500. For example, the control box 510 includes a processor 512 and a memory 514 having instructions stored thereon that, when executed by the processor 512, cause the control box 510 to instruct opening and/or closing various ones of the dampers 502, 504, 506, 508, 525. The contaminant scrubber 500 also includes two fans 516, 518 configured to cause air flow (e.g., of return air) through and to the inlet and outlet dampers 502, 504, 506, 508, 525. In other embodiments, the contaminant scrubber 500 may include a different number of fans 516, 518. As will be described in detail below, the operating mode instructed by the control box 510 may determine which of the dampers 502, 504, 506, 508, 525 is closed.

Focusing on FIG. 5A, the contaminant scrubber 500 includes a cartridge set 520 that, when the contaminant scrubber 500 operates in the sorption mode, sorbs (i.e., absorbs, adsorbs, or some combination thereof) contaminants passing therethrough. For example, in the sorption mode illustrated in FIG. 5A, the control box 510 instructs the sorption inlet damper 502 and the sorption outlet damper 506 to open if they are not already open, and the control box 510 instructs the regeneration inlet damper 504 and the regeneration outlet damper 508 and closed loop damper 525 to close if they are not already closed. Thus, return air flows into the contaminant scrubber 500 through the sorption inlet damper 502, flows through the cartridge set 520 which removes contaminants from the return air, and flows out of the contaminant scrubber 500 through the sorption outlet damper 506. It should be noted that, in some embodiments, the sorption inlet damper 302 may include various partially opened configurations, as instructed by the control box 510, to determine an amount of return air received by the contaminant scrubber 500. Further, it should be noted that the contaminant scrubber 300 in the illustrated embodiment includes a flame stop filter 522 disposed above a heating element 523, but that the heating element 523 may not be activated during the sorption mode illustrated in FIG. 5A.

FIG. 5B illustrates the contaminant scrubber 500 operating in the regeneration mode. In the illustrated embodiment, all four dampers 502, 304, 506, 508 of the contaminant scrubber 500 may be closed and closed loop damper 525 to open (e.g., as instructed by the control box 510). In the regeneration mode, the heating element 523 may be activated to heat an internal space 324 of the contaminant scrubber 500 (e.g., proximate the cartridge set 520). The heat may cause the contaminants absorbed by the cartridges of the cartridge set 520 to be released therefrom. The circular arrows illustrated in FIG. 5B represent the closed-loop heating by the heating element 523, and do not correspond with air flow in the internal space 524 of the contaminant scrubber 500. However, in some embodiments, the heating element 523 may be activated to heat the internal space 524 while the fans 516, 518 are active and the closed loop damper 525 stays open, to facilitate air flow through the internal space 524.

FIG. 5C illustrates the contaminant scrubber 500 operating in the purge mode (e.g., to remove contaminants released from the cartridge set 520 but within the internal space 524). As previously described, at least portions of the regeneration mode and the purge mode may overlap. For example, during the purge mode, the regeneration inlet damper 504 and the regeneration outlet damper 508 may modulate to open (e.g., as instructed by the control box 510), the sorption inlet damper 502 and the sorption outlet damper 506 may be closed, and the closed loop damper 525 will modulate to open (e.g., as instructed by the control box 510). The fans 516, 518 may draw a purge gas (e.g., air) into the internal space 524, where the purge gas urges the contaminants in the internal space 524 toward and through the regeneration outlet damper 508. The contaminant scrubber 500 operates to enable flow of the purge gas through the regeneration inlet and outlet dampers 504, 508, and the closed loop damper 525 will modulate to open, while the heating element 523 is activated (or just after the heating element 523 is deactivated). It should be noted that, in some embodiments, additional flow biasing devices external to the contaminant scrubber 500 may be utilized for fluid flow through the dampers 502, 504, 506, 508.

An overhead perspective view of an embodiment of a portion of the contaminant scrubber 500 of FIGS. 5A-5C is illustrated in FIG. 6. It should be noted that the portion of the contaminant scrubber 500 illustrated in FIG. 6 does not include all components of the contaminant scrubber 500. For example, as will be described in detail with reference to later figures, the contaminant scrubber 500 may include several doors or door panels, which are not shown in the illustrated embodiment, covering the front side of the contaminant scrubber 500 shown in FIG. 6.

However, the portion of the contaminant scrubber 500 illustrated in FIG. 6 includes the cartridge set 520 having a number (e.g., 12) of cartridges 532 configured to receive contaminants during the sorption mode, the fans 516, 518 configured to move air to and through the contaminant scrubber 500 (and mounted in a fan panel 534 disposed in the contaminant scrubber 500), the heating element 523 and the flame stop filter 522 disposed between the fans 516, 518 and the cartridge set 520, and a control box 536 mounted in a sidewall 538 (or side panel) of the contaminant scrubber 500. The contaminant scrubber 500 in the illustrated embodiment also includes the sorption inlet damper 502 and the purge inlet damper 504 disposed on the sidewall 538 (or side panel), a top panel 540 having the sorption outlet damper 506 and the purge outlet damper 508 disposed thereon, a bottom panel 542 disposed at a bottom 544 of the contaminant scrubber 500 and configured to enable positioning of the contaminant scrubber 500 (e.g., in the HVAC system). The illustrated contaminant scrubber 500 also includes two cross-member beams 546 configured to define a first segment 548 (e.g., upper segment, first compartment, upper compartment) having the closed loop damper 525 installed in a vertical wall 560 (noting that the vertical wall 560 may extend through more than the first segment 548), a second segment 550 (e.g., middle segment, second compartment, middle compartment), and a third segment 552 (e.g., lower segment, third compartment, lower compartment) of the contaminant scrubber 500.

Although not shown in the illustrated embodiment, three doors or door panels corresponding with the first segment 548, the second segment 550, and the third segment 552 may be disposed over the segments 548, 550, 552 of the contaminant scrubber 500. It should be noted that the outside cabinetry of the contaminant scrubber 500 (i.e., the sidewall 538 and opposing sidewall 539, the top panel 540, and the bottom panel 542 [and in some embodiments a back wall of the contaminant scrubber 500]) may include a sufficient material and gauge to directly couple with internal panels (e.g., the fan panel 534) of the contaminant scrubber 500. The outer cabinetry of the contaminant scrubber 500, including the sidewalk 538, 539, the top panel 540, the bottom panel 542, a back wall (not shown) of the contaminant scrubber 500, and the front side (including, in some embodiments, the doors illustrated in FIG. 9) of the contaminant scrubber 500 may be referred to as a housing 501 of the contaminant scrubber 500. In general, the "housing 501" of the contaminant scrubber 500 refers to the walls and panels which form the outer perimeter of the contaminant scrubber 500, as opposed to internal componentry. The components briefly described above will be described in detail below with respect to FIGS. 7-19.

Figure 7:
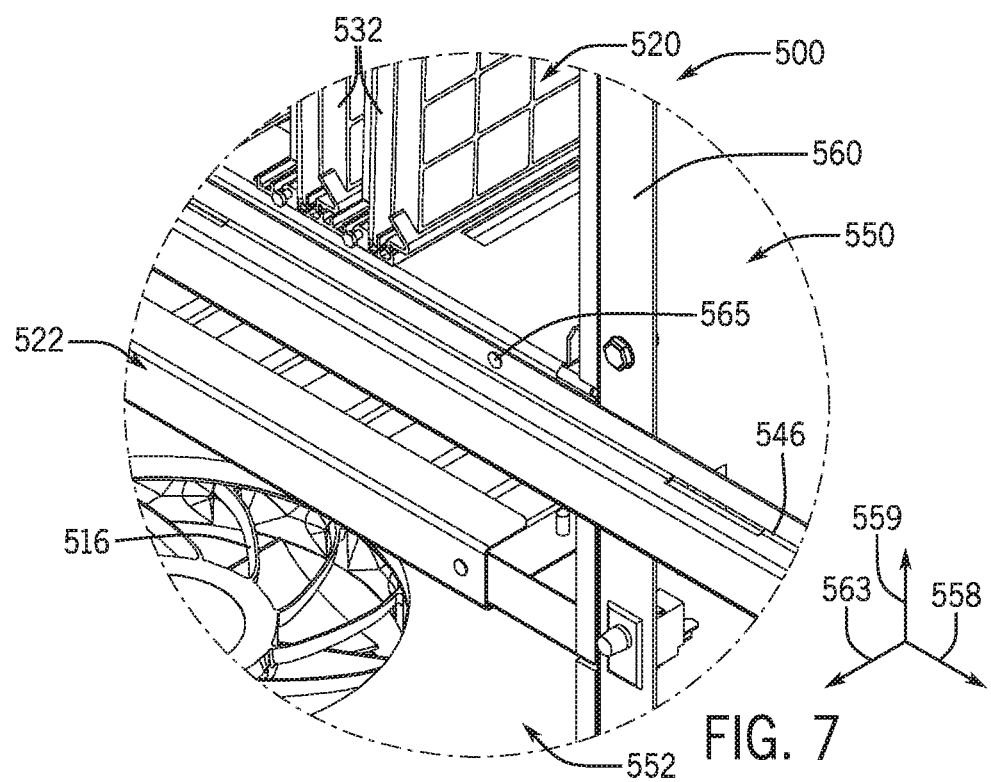
FIG. 7 is a close-up, overhead perspective view of an embodiment of a cross-member beam for use in the portion of the contaminant scrubber illustrated in FIG. 6, taken along line 7-7 in FIG. 6, in accordance with an aspect of the present disclosure.

FIG. 7 is a close-up, overhead perspective view of an embodiment of one of the cross-member beams 546 (extending in a first direction 558) for use in the portion of the contaminant scrubber 500 illustrated in FIG. 6, taken along line 7-7 in FIG. 6. In the illustrated embodiment, the cross-member beam 546 extends between the second (e.g., middle) segment 550 of the contaminant scrubber and the third (e.g., lower) segment 552 of the contaminant scrubber 500. A vertical wall 560 (e.g., panel) extends transverse (e.g., in a second direction 559 perpendicular to the first direction 558) to the cross-member beam 546, and may partially isolate the cartridge set 520, the fan 516, the flame stop filter 522, and the heating element (not shown) of the contaminant scrubber 500 on one side of the vertical wall 560 (e.g., panel) from a control box (not shown) on the opposing side of the vertical wall 560. The cartridge set 520 may be positioned on a shelf 561, which in some embodiments may be slidably coupled with a rack 562 mounted on the vertical wall 560 or some other feature of the contaminant scrubber 500. Further, in some embodiments, the cross-member beam 546 may be fixedly coupled to the shelf 561 (e.g., via a bolt 565 or other coupling means) on which the cartridge set 520 is disposed. Thus, the cross-member beam 546, the shelf 561, and the cartridge set 520 disposed on the shelf 561 may slide (e.g., in a third direction 563 orthogonal to the first and second directions 558, 559) outwardly from the contaminant scrubber 500 along the rack 562. It should be noted that the shelf 561 and/or cross-member beam 546, in certain embodiments, may be rigidly coupled to the housing 501 illustrated in FIG. 6, and the cartridges of the cartridge set 520 may slide along the shelf 561.

For example, in some embodiments, the cross-member beam 546 is fixed to the vertical wall 560 or another component of the contaminant scrubber 500, such as the side walls 538, 539 of the housing 501 illustrated in FIG. 6. Thus, the shelf 561 and/or cartridges of the cartridge set 520 may be slidable along or over the stationary cross-member beam 546. In some embodiments, the shelf 561 may also be rigidly coupled to the housing 501 illustrated in FIG. 6, or may otherwise be stationary, and the cross-member beam 546 may be secured to the shelf 561 and to the housing 501 (e.g., the side walls 538, 539) illustrated in FIG. 6 to secure a weight of the cartridge set 520 and distribute the weight to the housing 501. It should be noted that "rigidly coupled" as used herein refers to a coupling which is secured against external forces, such as via a weld or other permanent coupling.

In certain embodiments, the cross-member beam 546 may be removably coupled to the vertical wall 560 and/or side walls 58, 539 illustrated in FIG. 6, such that the cross-member beam 546 distributes the weight of the cartridge set 520 as described above but also is slidably removable from the housing 501 illustrated in FIG. 6. By rigidly or removably coupling the cross-member beam(s) 546 to portions of the housing 501 illustrated in FIG. 6 and to the cartridge set 520 or the shelf 561 on which the cartridge set 520 is disposed, a weight of the cartridge set 520 is distributed across the housing 501. In each of the above-described embodiments, the cartridge set 520 may be at least partially (or fully) removable from the second (e.g., middle) segment 550 of the contaminant scrubber 500 (e.g., for maintenance purposes, for replacement, etc.). In some embodiments, the cross-member beam(s) 546 may not be coupled to the side walls 538, 539 of the housing 501, and may instead couple to only the cartridge set 520 or the shelf 561, and may be slidable away from the housing 501 to facilitate removal of the cartridge set 520 therefrom.

It should be noted that the term "removably coupled" herein refers to a coupling which is removable without significant disassembly or breaking of components of the contaminant scrubber, and may differ from "rigidly coupled." For example, a clip or certain fasteners may enable "removably couple" components together in accordance with the present disclosure, whereas a weld does not "removably couple" components together in accordance with the present disclosure. As will be appreciated following discussion of later figures, doors of the contaminant scrubber 500 may be disposed on either side of the illustrated cross-member beam 546 (e.g., for ease of access to the second [middle] segment 550 and the third [lower] segment 552 of the contaminant scrubber 500).

Figure 8:
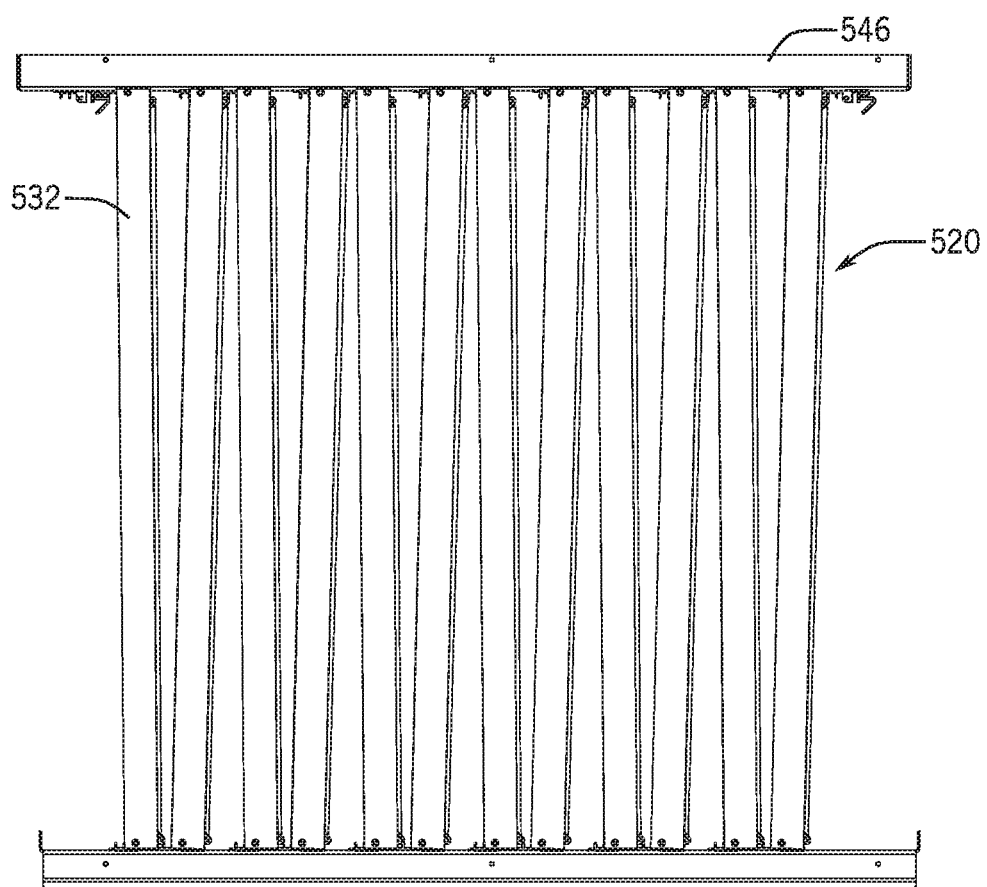
FIG. 8 is a front view of an embodiment of a cartridge set for use in the portion of the contaminant scrubber illustrated in FIG. 6, in accordance with an aspect of the present disclosure.

FIG. 8 is a front view of an embodiment of the cartridge set 520 having the cartridges 532 for use in the portion of the contaminant scrubber 500 illustrated in FIG. 6. In the illustrated embodiment, two cross-member beams 546 are fixedly coupled with the cartridge set 520. In some embodiments, only one (e.g., the lower) of the cross-member beams 546 may be fixedly coupled to the cartridge set 520. By fixedly coupling the cross-member beam(s) 546 to the cartridge set 520 (e.g., as opposed to a structure of the contaminant scrubber 500), a load on the cross-member beam(s) 546 is reduced, thereby reducing sag of the cross-member beam(s) 546. As previously described, the cartridges 532 of the cartridge set 520 operate to absorb contaminants (e.g., carbon dioxide) during a sorption mode of the contaminant scrubber 500. During a regeneration cycle of the contaminant scrubber 500, the cartridges 532 of the cartridge set 520 are heated to release the contaminants (e.g., carbon dioxide). After (or as) the contaminants are released from the cartridges 532 of the cartridge set 520 into an internal space of the contaminant scrubber 500, the contaminants may be routed via an air flow out of the internal space during a purge mode of the contaminant scrubber 500. As shown, the cartridge set 520 may include twelve cartridges 532. In other embodiments, the cartridge set 520 may include more or fewer cartridges 532. For example, the cartridge set 520 may include thirteen cartridges 532 in another embodiment.

FIG. 9 is an overhead perspective view of an embodiment of a door system 580 used to at least partially close the portion of the contaminant scrubber 500 illustrated in FIG. 6 (i.e., the front face of the housing 501 of FIG. 6). In the illustrated embodiment, the door system 580 includes a first (e.g., upper) door 582, a second (e.g., middle) door 584, and a third (e.g., lower) door 586. In some embodiments, the doors 582, 584, 586 may be considered a part of the housing of the contaminant scrubber (e.g., such as the housing 501 of the contaminant scrubber 500 illustrated in FIG. 6). The first, second, and third doors 582, 584, 586 correspond with the first, second, and third segments 548, 550, 552 of the contaminant scrubber 500 (illustrated in FIG. 6). Each door 582, 584, 586 includes several wing latches 588 configured to interface with a structural panel (e.g., the sidewall 538) of the contaminant scrubber 500 illustrated in FIG. 6. Each wing latch 588 is rotatable with respect to the corresponding door 582, 584, 586. Thus, each wing latch 588 in the illustrated embodiment engages the structural panel of the contaminant scrubber 500 via a ¼ turn.

In some embodiments, one or more of the doors 582, 584, 586 may include a lock-in tab 594. For example, details A and B of FIG. 9 illustrate the lock-in tab on a surface of the first (upper) door 582. The lock-in tab 594 may engage a structure of the contaminant scrubber, such as one of the aforementioned cross-member beams 546 of FIGS. 7 and 8, to position the door 582 in place prior to the wing latches 588 being turned to fix the door 582 in place.

Each door 582, 584, 586 in the illustrated embodiment also includes at least one recessed handle 590. When removing any one of the doors 582, 584, 586 from the contaminant scrubber 500, the wing latches 588 may be turned a quarter of a revolution, and the recessed handle(s) 590 may be gripped/pulled for removal of the corresponding door 582, 584, or 586. It should be noted that the second (e.g., middle) door 584 includes two thumb latches 592 that enable quick lock/unlock access of the second (e.g., middle) door 584. Once the wing latches 588 are turned to the unlock position, the thumb latches 592 may be pressed down with a hand in each recessed handle 590 to remove the door 584.

FIG. 10 is an exploded perspective view of an embodiment of a fan system 60 for use in the portion of the contaminant scrubber 500 illustrated in FIG. 6. In the embodiment illustrated in FIG. 10, the fan system 60 includes the first fan 516, the second fan 518, and the fan panel 534 (e.g., fan wall, main wall) having a first opening 602 configured to receive the first fan 516 and a second opening 604 configured to receive the second fan 518. The fan panel 534 also includes a number of mounting holes 606 surrounding the first opening 602 and the second opening 604. In the illustrated embodiment, four mounting holes 606 surround the first opening 602, and four mounting holes 606 surround the second opening 604; however, more or fewer mounting holes 606 for each opening 602, 604 are also possible.

Each mounting hole 606 is configured to receive a nut blind insert 608. Each nut blind insert 608 is configured to receive a nut blind screw 610 that also extends through an opening in the corresponding first fan 516 or the second fan 518. In other words, the nut blind screws 610 extend through features of the fan and engage the nut blind inserts 608 in order to mount the fans 516, 518 in the corresponding openings 602, 604 of the fan panel 534. The illustrated assembly enables mounting of the fans 516, 518 in the corresponding openings 602, 604 without having to tighten screws in an area of the contaminant scrubber 500 having low or insufficient clearance. However, other fastening assemblies are also possible.

FIG. 11 is an overhead perspective view of an embodiment of the control box 536 for use in the portion of the contaminant scrubber 500 illustrated in FIG. 6. In the illustrated embodiment, the control box 536 includes a frame having two side walls 620, 622, a bottom wall 624, a top wall 626, and a back wall 628. In the illustrated embodiment, the bottom wall 624 includes lower wire feed holes 630. Further, the top wall 626 includes upper wire feed holes 632. The lower wire feed holes 630 and upper wire feed holes 632 may be punched through the corresponding bottom and top walls 624, 636. In other words, the bottom and top walls 624, 626 of the frame (e.g., enclosure) of the control box 536 are configured to enable passage of wires through the feed holes 630, 632 punched therethrough without requiring separate wire feed plates.

FIGS. 12 and 13 are overhead perspective views of features of the top panel 540 of the portion of the contaminant scrubber 500 illustrated in FIG. 6. In particular, FIG. 12 illustrates an overhead perspective view of the top panel 540 with the outlet dampers 506, 508 mounted thereon. FIG. 13 illustrates a close-up view, taken along line 13-13 in FIG. 12, of an eyelet 630 fixed to the top panel 540. As shown in FIG. 12, the top panel 540 may include four eyelets 630 fixed thereto, one in each corner of the top panel 540. The eyelets may be gripped in order to lift the contaminant scrubber 500 upwardly, and/or the top panel 540 upwardly away from the contaminant scrubber 500 (e.g., if the top panel 540 is not engaged with other panels or structures of the contaminant scrubber 500).

Focusing on the embodiment illustrated in FIG. 13, the eyelet 630 may be fixed to the top panel 540 via a locking assembly. For example, the top panel 540 may include an opening 632 extending from a top surface 634 of the top panel 540 to a bottom surface 636 of the top panel 540. A nut insert 640 is secured into the backing plate 638 (e.g., as indicated by dashed line 641). The assembly of the nut insert 640 and the backing plate 638 is positioned proximate to (and contacting) the bottom surface 636 of the top panel 540. In other words, while the exploded view in FIG. 13 shows the nut insert 640 on an opposing side of the top panel 540 from the backing plate 638, in practice, the assembly of the nut insert 640 and the backing plate 638 is positioned on the top surface 634 of the top panel 540. The nut insert 640 may receive a locking nut 642 and eyelet 630 extending through the opening 632 in the top panel 540. The locking nut 642 may operate to couple the eyelet 630 with the nut insert 640.

The assembly may be tightened via the locking nut 642 in order to fixedly couple the eyelet 630 with the top panel 540. In some embodiments, the eyelet 630 may be welded to improve a coupling between the eyelet 630 and the top panel 540. Additionally or alternatively, the locking nut 642 may be welded in the nut insert 640.

FIGS. 14, 15, 16, and 17 illustrate various views of embodiments of certain dampers (or mounting features thereof) included in the portion of the contaminant scrubber 500 of FIG. 6. In particular, FIG. 14 is an overhead perspective view of an embodiment of one damper 504 (although FIGS. 14-17 may be applicable to any one of the dampers 502, 504, 506, 508 illustrated in FIG. 6); FIG. 15 is a close-up, exploded perspective view of an embodiment of a mounting bracket 652 for use on/with the damper 504 of FIG. 14; FIG. 16 is an overhead perspective view of an embodiment of the damper 504 installed in a wall or panel (e.g., the sidewall 538) of a contaminant scrubber (e.g., the contaminant scrubber 500 illustrated in FIG. 6); and FIG. 17 is a close-up, exploded perspective view of an embodiment of a spin ring 680 for installing the damper 504 of FIG. 16 in the side wall 538 of FIG. 16, in accordance with aspects of the present disclosure.

Focusing first on FIG. 14, the illustrated damper 504 includes an actuator mounting bracket 652 and an actuator 654. The actuating mounting bracket 652 and the actuator 654, as shown, may be assembled on the damper 504 prior to mounting the damper to the contaminant scrubber.

FIG. 15 shows an exploded view of the mounting bracket 652, which includes an actuator lock strap 656. The actuator lock strap 656 may include an engagement features 658 extending upwardly that directly engages the actuator (e.g., the actuator 654 in FIG. 14). Two screws 660 are used to secure actuator lock strap 656 that may operate to couple the actuator (e.g., the actuator 654 in FIG. 14) to the mounting bracket 652. Accordingly, as described above with reference to FIG. 14, the entire damper 504 (including the mounting bracket 652 and the actuator 654) may be assembled prior to installing the damper 504 on the contaminant scrubber.

FIG. 16, as described above, illustrates the damper 504 installed in the top panel 538 (e.g., of the contaminant scrubber 500 of FIG. 6) by way of the spin ring 680. In particular, the spin ring 680 may be installed in an opening 681 of the sidewall 538, and the damper 504 may be coupled with the spin ring 680 via self-tapping screws 682 (two of which are viewable in FIG. 16). FIG. 17 illustrates an embodiment of the spin ring 680 and four self-tapping screws 682 which may be used to couple the spin ring 680 with the damper 504. Thus, the damper 504 is fixedly coupled with the spin ring 680, which is capable of spinning within the opening 681 of the sidewall 538. Indeed, as shown in FIG. 16, two of the spin rings 680 are illustrated extending through an inner surface 684 of the damper 504.

FIGS. 18 and 19 illustrate overhead perspective views of the bottom panel 542 of the portion of the contaminant scrubber 500 illustrated in FIG. 6. Specifically, FIG. 18 illustrates the bottom panel 542, and FIG. 19 illustrates a close-up exploded view, taken along line 19-19 in FIG. 18, of a foot mounting assembly 700 for a self-leveling foot 702 (e.g., spring-loaded foot) of the contaminant scrubber. As shown in FIG. 18, the bottom panel 542 includes an upper surface 698, a lower surface 699 opposite the upper surface 698, and four foot mounting assemblies 700 extending through the bottom panel 542 from the upper surface 698 to the lower surface 699. Each foot mounting assembly 700 encompasses a self-leveling foot (e.g., the self-leveling foot 702 illustrated in FIG. 19). The four self-leveling feet operate to level the bottom panel 542 (e.g., of the portion of the contaminant scrubber 500 of FIG. 6) in order to level the contaminant scrubber and compensate for situations where the contaminant scrubber is disposed on an uneven surface.

As shown in FIG. 19, the foot mounting assembly 700 includes the self-leveling foot 702, a backing plate 704 disposed proximate to (and in contact with) the upper surface 698 of the bottom panel 542, and a nut insert 706. The nut insert 706 is secured into backing plate 704 (e.g., as indicated by dashed line 705), and the assembly of the nut insert 706 and the backing plate 704 is placed on the upper surface 698 of the bottom panel 542. In other words, while the exploded view in FIG. 19 shows the nut insert 706 on an opposing side of the bottom panel 542 from the backing plate 704, in practice, the assembly of the nut insert 706 and the backing plate 704 is positioned on the upper surface 698 of the bottom panel 542. The nut insert 706 may receive a fastening portion 708 of the self-leveling foot 702 to secure the self-leveling foot 702 in position. As previously described, the self-leveling foot 702 illustrated in FIG. 19 (and the three other self-leveling feet of the bottom panel 542) may be spring-loaded (or otherwise self-leveling) to operate to level the contaminant scrubber (e.g., in areas where the contaminant scrubber is positioned on an uneven surface and a load of the contaminant scrubber on the self-leveling feet differs across the self-leveling feet).

One or more of the disclosed embodiments, alone or in combination, may provide one or more technical effects useful in enhancing efficiency of a heat exchanger of an HVAC system. The above-described contaminant scrubber features facilitate improved assembly and manufacturing, ease of access for maintenance purposes, and enhanced performance. For example, the top panel/wall having eyelet lifters, the bottom panel/wall having self-leveling feet, and the blind nut inserts/screws of the fan assembly facilitates improved assembly and manufacturing of the contaminant scrubber. Further, the compartmentalizing of the contaminant scrubber, and removable nature of the cartridge set, facilitates ease of access for maintaining the contaminant scrubber. Further still, the cartridge set structure enables an increased number of cartridges, which enhances contaminant removal.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out an embodiment, or those unrelated to enabling the claimed embodiments). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A contaminant scrubber of a heating, ventilation, and air conditioning (HVAC) system, the contaminant scrubber comprising:
   a housing comprising a first side wall and a second side wall opposite to the first side wall;
   a first compartment formed within the housing, a second compartment formed within the housing and having a cartridge set removably disposed therein, and a third compartment formed within the housing, wherein the second compartment is positioned between the first compartment and the third compartment;
   a first cross-member beam extending along a first bottom end of the first compartment and a second top end of the second compartment, wherein the first cross-member beam extends from the first side wall of the housing to the second side wall of the housing;
   a second cross-member beam extending along a second bottom end of the second compartment and a third top end of the third compartment, wherein the second cross-member beam extends from the first side wall of the housing to the second side wall of the housing; and
   a heating element disposed in the second compartment or the third compartment.

2. The contaminant scrubber of claim 1, wherein the first cross-member beam is rigidly coupled to the first side wall of the housing.

3. The contaminant scrubber of claim 1, wherein the first cross-member beam is removably coupled to the first side wall of the housing.

4. The contaminant scrubber of claim 1, wherein the first cross-member beam is not coupled to the first side wall of the housing.

5. The contaminant scrubber of claim 1, wherein the second cross-member beam is rigidly coupled to the first side wall of the housing.

6. The contaminant scrubber of claim 1, wherein the second cross-member beam is removably coupled to the first side wall of the housing.

7. The contaminant scrubber of claim 1, wherein the second cross-member beam is not coupled to the first side wall of the housing.

8. The contaminant scrubber of claim 1, wherein the first cross-member beam, the second cross-member beam, or both are coupled to the first side wall and to either the cartridge set or a shelf on which the cartridge set is disposed.

9. The contaminant scrubber of claim 1, comprising:
   a first door facilitating access to the first compartment and positioned above the first cross-member beam;
   a second door facilitating access to the second compartment and positioned between the first cross-member beam and the second cross-member beam; and
   a third door facilitating access to the third compartment and positioned below the second cross-member beam.

10. The contaminant scrubber of claim 1, wherein the cartridge set comprises 12 cartridges.

11. The contaminant scrubber of claim 1, wherein the cartridge set comprises 13 cartridges.

12. The contaminant scrubber of claim 1, comprising a fan assembly disposed in the third compartment.

13. The contaminant scrubber of claim 1, comprising a rack disposed in the second compartment adjacent to the second cross-member beam, wherein the cartridge set or a shelf on which the cartridge set is disposed slidingly engages the rack to facilitate removal of the cartridge set or a portion thereof from the housing.

14. A contaminant scrubber, comprising:
   a housing having a first side wall and a second side wall;
   a shelf disposed in the housing and extending between the first side wall and the second side wall;
   a cartridge set disposed on the shelf;
   a cross-member beam extending adjacent to the shelf from the first side wall of the housing to the second side wall of the housing, wherein the cross-member beam is coupled to the first side wall and to the cartridge set or the shelf; and
   a heating element disposed in the housing and configured to be activated during a regeneration mode of the contaminant scrubber to heat the cartridge set and cause contaminants to be released from the cartridge set.

15. The contaminant scrubber of claim 14, comprising an additional cross-member beam coupled to the cartridge set or the shelf, wherein the cross-member beam and the additional cross-member beam are disposed on opposing sides of the cartridge set.

16. The contaminant scrubber of claim 14, comprising a door system extending along a front face of the housing of the contaminant scrubber between the first side wall and the second side wall, wherein the door system comprises a cartridge compartment door which facilitates access to a cartridge compartment in which the cartridge set is disposed, and wherein the shelf at least partially defines the cartridge compartment.

17. The contaminant scrubber of claim 16, wherein the door system comprises an additional door, wherein the cartridge compartment door is disposed on a first side of the cross-member beam, and wherein the additional door is disposed on a second side of the cross-member beam opposite to the first side, such that the additional door facilitates access to an additional compartment of the contaminant scrubber separate from the cartridge compartment and positioned on the second side of the cross-member beam.

18. The contaminant scrubber of claim 17, wherein the door system comprises a third door facilitating access to a third compartment separate from the cartridge compartment, wherein the cartridge compartment door is disposed between the additional door and the third door, and wherein the cartridge compartment is disposed between the additional compartment and the third compartment.

19. A heating, ventilation, and air conditioning (HVAC) system having a contaminant scrubber, the contaminant scrubber comprising:
   a housing configured to house components of the contaminant scrubber, wherein the housing comprises a first side wall and a second side wall opposite to the first side wall;
   a cartridge set disposed in a cartridge compartment formed between the first side wall and the second side wall of the housing, wherein the cartridge compartment is bounded by a first cross-member beam of the contaminant scrubber extending from the first side wall to the second side wall, and a second cross-member beam of the contaminant scrubber extending from the first side wall to the second side wall;
   a door system configured to enable access to the components within the housing, wherein the door system extends between the first side wall and the second side wall of the housing, and wherein the door system comprises at least a cartridge compartment door disposed between the first cross-member beam and the second cross-member beam; and a heating element disposed in the housing and configured to be activated during a regeneration mode of the contaminant scrubber to heat the cartridge set such that contaminants are released from the cartridge set.

20. The HVAC system of claim 19, wherein the door system comprises an upper door disposed above the first cross-member beam and below a top panel of the housing, and wherein the door system comprises a lower door disposed below the second cross-member beam and above a bottom panel of the housing.

21. The HVAC system of claim 19, wherein the first cross-member beam is rigidly coupled to the first side wall, wherein the second cross-member beam is rigidly coupled to the first side wall, or both.

22. The HVAC system of claim 19, comprising a shelf at least partially defining the cartridge compartment and on which the cartridge set is disposed, wherein the first cross-member beam, the second cross-member beam, or both are rigidly coupled to the shelf.

23. The contaminant scrubber of claim 1, wherein the housing comprises:

a back wall extending between the first side wall and the second side wall;

a front wall extending between the first side wall and the second side wall; and a door assembly coupled to the front wall and configured to enable access to an inside of the housing through the front wall, wherein the cartridge set is disposed on a slidable rack configured to enable the cartridge set to move through the front wall by way of the door assembly.

\* \* \* \* \*